United States Patent
Zhang et al.

(10) Patent No.: US 12,182,555 B2
(45) Date of Patent: Dec. 31, 2024

(54) ADAPTING EXISTING SOURCE CODE SNIPPETS TO NEW CONTEXTS

(71) Applicant: GOOGLE LLC, Mountain View, CA (US)

(72) Inventors: Qianyu Zhang, Sunnyvale, CA (US); Bin Ni, Fremont, CA (US); Rishabh Singh, San Jose, CA (US); Olivia Hatalsky, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/379,315

(22) Filed: Oct. 12, 2023

(65) Prior Publication Data
US 2024/0036843 A1    Feb. 1, 2024

Related U.S. Application Data

(63) Continuation of application No. 17/901,128, filed on Sep. 1, 2022, now Pat. No. 11,822,909, which is a
(Continued)

(51) Int. Cl.
*G06F 8/30* (2018.01)
*G06F 8/33* (2018.01)
(Continued)

(52) U.S. Cl.
CPC ............... *G06F 8/447* (2013.01); *G06F 8/30* (2013.01); *G06F 8/33* (2013.01); *G06F 8/34* (2013.01);
(Continued)

(58) Field of Classification Search
CPC ... G06F 8/447; G06F 8/34; G06F 8/36; G06F 8/71; G06F 8/30; G06N 3/045; G06N 3/047
See application file for complete search history.

(56) References Cited

U.S. PATENT DOCUMENTS 5,845,143 A    12/1998   Yamauchi
8,745,581 B2   6/2014    Esbensen et al.
(Continued)

FOREIGN PATENT DOCUMENTS

KR    101136007    4/2012

OTHER PUBLICATIONS

Lachaux et al., "Unsupervised Translation of Programming Languages" arXiv:2006.03511v3 [cs.CL] dated Sep. 22, 2020.
(Continued)

*Primary Examiner* — Tuan A Vu
(74) *Attorney, Agent, or Firm* — Gray Ice Higdon

(57) ABSTRACT

Implementations are described herein for adapting existing source code snippets to new contexts. In various implementations, a command may be detected to incorporate an existing source code snippet into destination source code. An embedding may be generated based on the existing source code snippet, e.g., by processing the existing source code snippet using an encoder. The destination source code may be processed to identify one or more decoder constraints. Subject to the one or more decoder constraints, the embedding may be processed using a decoder to generate a new version of the existing source code snippet that is adapted to the destination source code.

17 Claims, 8 Drawing Sheets

Related U.S. Application Data continuation of application No. 17/159,524, filed on Jan. 27, 2021, now Pat. No. 11,461,081.

(51) Int. Cl.
| | |
|---|---|
| *G06F 8/34* | (2018.01) |
| *G06F 8/36* | (2018.01) |
| *G06F 8/41* | (2018.01) |
| *G06F 8/71* | (2018.01) |
| *G06F 16/00* | (2019.01) |
| *G06F 16/242* | (2019.01) |
| *G06N 3/045* | (2023.01) |
| *G06N 3/088* | (2023.01) |

(52) U.S. Cl.
CPC ............... *G06F 8/36* (2013.01); *G06F 8/71* (2013.01); *G06F 16/00* (2019.01); *G06F 16/2425* (2019.01); *G06N 3/045* (2023.01); *G06N 3/088* (2013.01)

(56) References Cited

U.S. PATENT DOCUMENTS

| | | |
|---|---|---|
| 11,461,081 B2 | 10/2022 | Zhang et al. |
| 2018/0189039 A1 | 7/2018 | Hart et al. |
| 2019/0079754 A1 | 3/2019 | Makkar |
| 2019/0228319 A1 | 7/2019 | Gupta et al. |
| 2020/0104102 A1 | 4/2020 | Brockschmidt et al. |
| 2020/0125482 A1 | 4/2020 | Smith et al. |
| 2021/0042472 A1 | 2/2021 | Nishida et al. |
| 2021/0141863 A1 | 5/2021 | Wu et al. |
| 2021/0157991 A1* | 5/2021 | Wang ............... G06N 3/047 |
| 2021/0181931 A1 | 6/2021 | Xu et al. |
| 2021/0279042 A1 | 9/2021 | Allamanis et al. |
| 2021/0357187 A1* | 11/2021 | Clement ............ G06N 3/045 |
| 2021/0357307 A1 | 11/2021 | Deng et al. |
| 2021/0397610 A1 | 12/2021 | Singh et al. |
| 2022/0236971 A1 | 7/2022 | Zhang et al. |
| 2023/0004366 A1 | 1/2023 | Zhang et al. |

OTHER PUBLICATIONS

Allamanis et al., "SmartPaste: Learning to Adapt Source Code" arXiv:1705.07867v1 [cs.LG] dated May 22, 2017.
Portenier et al., "Smart, Deep Copy-Paste" arXiv:1903.06763v1 [cs.GR] dated Mar. 15, 2019.
Allamanis et al., "Understanding Source Code through Machine Learning to Create Smart Software Engineering Tools" The University of Edinburgh Informatics, Mar. 13, 2016.
Bellon et al., "Comparison and Evaluation of Clone Detection Tools" IEEE Transactions on Software Engineering. Jan. 1, 1970.

* cited by examiner

SOURCE CODE EDITOR APPLICATION

```
void* fakeReachoutFunction(void* arg)
{
    unsigned long i = 0;
    counter += 1;
    printf("\n Reaching out to employees\n",
        counter);
    for (i = 0; i < (employee_count); i++)
       sendText(employee_phone(i), "Don't
          forget about tonight's picnic at 6:30")
       resetPassword(employeeID)
       ;
    printf("\n Job %d has finished\n", counter);
    return NULL;
}
```

Fig. 6A

SOURCE CODE EDITOR APPLICATION

```
void* fakeReachoutFunction(void* arg)
{
    unsigned long i = 0;
    counter += 1;
    printf("\n Reaching out to employees\n",
        counter);
    for (i = 0; i < (employee_count); i++)
       sendText(employee_phone(i), "Don't
          forget about tonight's picnic at 6:30")
       updateCredentials(i)
       ;
    printf("\n Job %d has finished\n", counter);
    return NULL;
}
```

Fig. 6B

ADAPTING EXISTING SOURCE CODE SNIPPETS TO NEW CONTEXTS

BACKGROUND

Much of the time and effort involved with modern computer programming tends to be skewed towards adapting existing source code to new contexts, rather than writing new source code from scratch. Given the myriad different languages, frameworks, and libraries that are available, adapting source code for new contexts comprises a significant portion of software developers' time.

SUMMARY

Implementations are described herein for adapting existing source code snippets to new contexts. In various implementations, a programmer may issue a command to incorporate/import an existing source code snippet, e.g., from one library, into destination source code that forms part of a different library or code base. This command may take various forms, such as a command to paste content of a clipboard into the destination source code, a command to drag-and-drop a graphical element representing a block of source code into a portion of a graphical user interface (GUI) corresponding to the destination source code, and so forth. Rather than requiring the programmer to manually adapt aspects of the existing source code snippet, such as variable and/or function names, to the destination source code's context, techniques described herein may perform this adaptation automatically, e.g., using various types of machine learning models and/or heuristics.

In some implementations, one or both of the existing source code snippet and the destination source code may be processed using an encoder portion of an encoder-decoder machine learning model (also referred to as an "autoencoder" or "neural language model"). For example, the existing source code snippet may be inserted into the desired location of the destination source code, and then tokens/symbols of the resulting combination may be iteratively processed based on the encoder. Alternatively, in some implementations, embeddings generated from the existing source code snippet and the destination source code may be combined (e.g., concatenated, averaged, etc.) and processed based on the encoder to generate a new embedding.

In various implementations, one or both of the encoder and decoder portions of the encoder-decoder model may take the form of a sequence-to-sequence machine learning model such as a recurrent neural network, a long short-term memory (LSTM) network, a gated recurrent unit (GRU) network, a Bidirectional Encoder Representations from Transformers (BERT)-based transformer, etc. An embedding (also referred to as a "feature vector," a "feature embedding," etc.) generated based on the encoder may include contextual information from one or both of the existing source code snippet and the destination source code, such as syntactic information, semantic information, structural information, etc. In some implementations, the embedding may represent a generalized (e.g., reduced dimension) form of the existing source code snippet that can more easily be adapted into different contexts. Alternatively, other types of machine learning models may be used to encode source code into embeddings. For example, in some implementations, source code may be first converted into a graph, e.g., an abstract syntax tree (AST), and then the graph may be processed using a graph-based machine learning model such as a graph neural network (GNN) to generate the embedding.

However the embedding is generated, it may be applied as input across the decoder portion to generate output that includes the existing source code snippet, adapted to the context of the destination source code. In some such implementations, application of the decoder may be subject to decoder constraints. For example, the destination source code may be processed using various feature extraction techniques (machine learning or heuristic based) to identify decoder constraints that should be applied. These decoder constraints may take various forms, such as a dictionary of variable names and/or function names contained in the destination source code. In various implementations, the decoder may be biased towards and/or limited to the variable/function names in this dictionary. Thus, for instance, an embedding generated by the encoder portion, which may represent a more generalized form of the existing source code snippet, may be processed using a decoder that is biased towards variable/function names in the dictionary. The resulting output may comprise a new version of the existing source code snippet adapted to the destination source code.

In some implementations, the decoder constraints may capture elements about source code beyond variable and function names, such as programming or coding style. For example, source code written by a highly-respected and/or prolific programmer may be used to train a machine learning model such as a neural language model. Later, that programmer's style may be "detected" in destination source code, e.g., as a context into which an existing source code snippet is to be incorporated. In the context of the present disclosure, the programmer's tendencies may be captured as stylistic and/or formatting constraints that may be employed as decoder constraints as described herein.

Programming/coding styles may come in numerous forms, just as different programmers may tend to write source code in numerous ways. Some non-limiting examples of the types of elements that might contribute to programming/coding style are selection, placement, and/or formatting of symbols/tokens such as spaces, tabs, parenthesis, comments, and so forth. Suppose a company has a code base written by one or more particular programmers in a particular programming style. Suppose the company hires a new programmer who may or may not necessarily be familiar with that programming style. When the new hire attempts to copy existing source code from some other code base (e.g., publicly available) into the company's code base, the company's programming style/context may be captured via application of the machine learning model such that the to-be-copied existing source code is adapted to the same programming style when pasted.

In some implementations, techniques described herein may be used to semantically "wire" source code snippets together. For example, the new version of the existing source code snippet that is adapted to the destination source code's context may include "glue code" that logically/semantically/syntactically couples the existing source code snippet with the destination source code. For example, if the existing source code snippet includes a function call, then glue code may be generated to adapt the function call to the destination source code. To this end, in various implementations, one or both of the encoder and decoder portions of the encoder-decoder machine learning model may be trained based on training data that includes glue code coupling the same or similar functions to other source code in different contexts.

In some implementations, a method implemented using one or more processors may include: detecting a command to incorporate an existing source code snippet into destination source code; generating an embedding based on the existing source code snippet, wherein the generating includes processing the existing source code snippet using an encoder; processing the destination source code to identify one or more decoder constraints; subject to the one or more decoder constraints, processing the embedding using a decoder to generate a new version of the existing source code snippet that is adapted to the destination source code.

In various implementations, the one or more decoder constraints may include a dictionary of variable names or function names extracted from the destination source code, and processing the embedding using the decoder may include biasing the decoder towards the variable names or function names in the dictionary. In various implementations, the one or more decoder constraints may include programming stylistic and formatting constraints, and processing the embedding using the decoder may include biasing the decoder towards the programming stylistic and formatting constraints.

In various implementations, the existing source code snippet may include a function call, and processing the embedding using the decoder may include generating glue code to adapt the function call to the destination source code. In various implementations, the command may include a paste command. In various implementations, the command may include a command to drag-and-drop a graphical element that includes the existing source code snippet into the destination source code. In various implementations, the generating may include processing at least a portion of the destination source code using the encoder.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6A and FIG. 6B depict an example graphical user interface (GUI) that may be presented in accordance with various implementations described herein.

DETAILED DESCRIPTION

Figure 1:
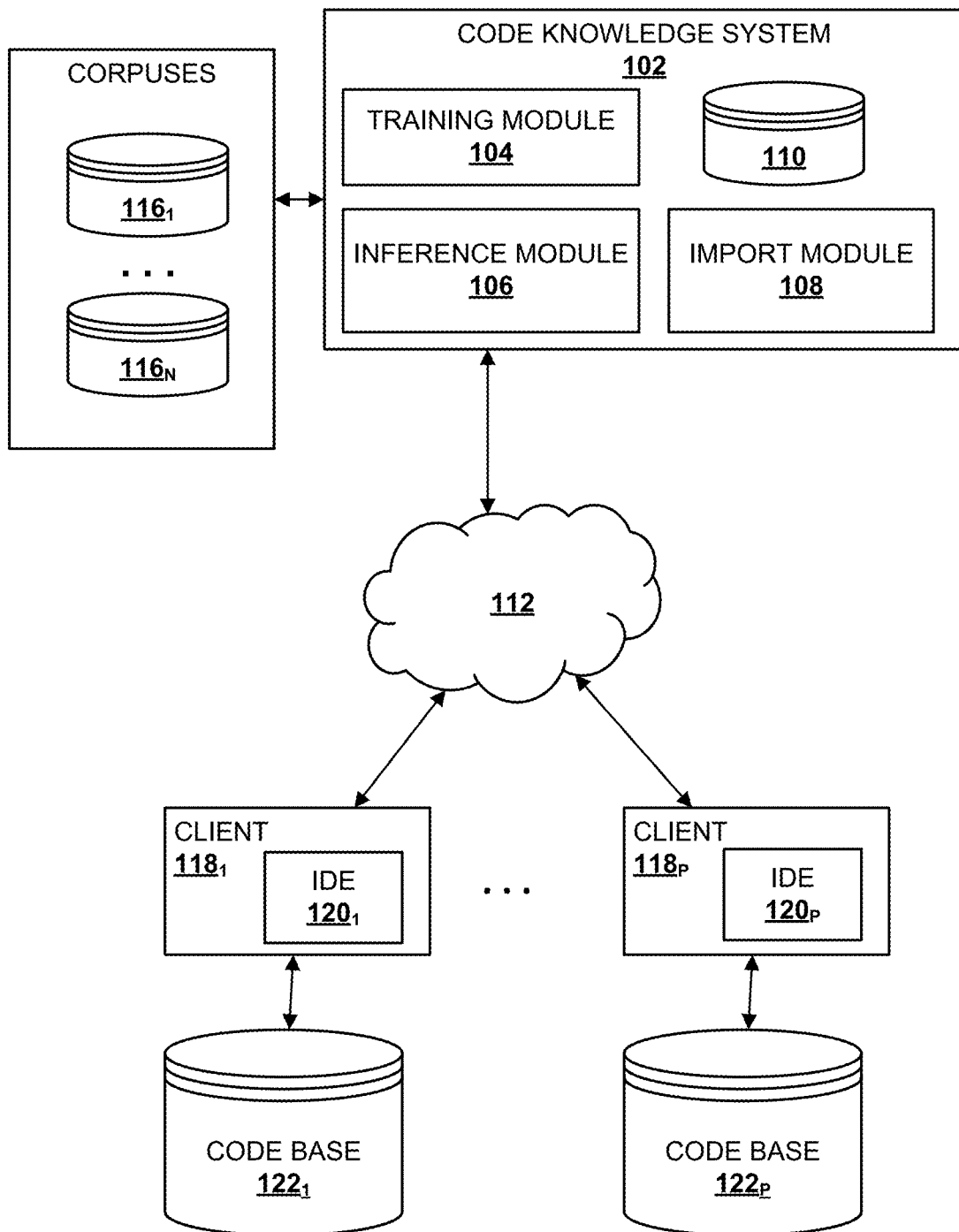
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs," etc.) that execute computer-readable instructions stored in memory, or other types of logic such as application-specific integrated circuits ("ASIC") (including "tensor processing units" or "TPUs"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure" or "the cloud," although this is not required.

A code knowledge system 102 may be provided for helping clients $118_{1-P}$ manage their respective code bases $122_{1-P}$. In various implementations, code knowledge system 102 may be accessible, e.g., by clients $118_{1-P}$, via one or more networks 112, such as the Internet or one or more local area networks.

Code knowledge system 102 may include, among other things, a training module 104, an inference module 106, and an import module 108 that are configured to perform selected aspects of the present disclosure in order to help one or more clients $118_{1-P}$ to make changes to one or more corresponding code bases $122_{1-P}$, particularly to adapt existing source code snippets to new contexts. Each client 118 may be, for example, an entity or organization such as a business (e.g., financial institute, bank, etc.), non-profit, club, university, government agency, or any other organization or individual that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth. In some implementations, each client 118 may make changes to its code base 122 using one or more instances of an integrated development environment (IDE) 120 operating on one or more computing devices.

Training module 104 and inference module 106 may have access to one or more machine learning model(s) 110. These machine learning models 110 may take various forms, including but not limited to an encoder-decoder, various flavors of a recurrent neural network (RNN, e.g., long short-term memory, or "LSTM", gate recurrent units, or "GRU", etc.), a transformers (BERT)-based transformer model, a graph neural network (GNN) or other graph-based models, and any other type of machine learning model that may be applied to facilitate selected aspects of the present disclosure, particularly adapting existing source code snippets to new contexts.

In various implementations, training module 104 may be configured to train machine learning model(s) 110 based on one or more corpuses of source code $116_{1-N}$. One or more corpuses of source code $116_{1-N}$ may include source code files written in any number of programming languages, as well as in multiple versions of the same programming language (e.g., Python1 versus Python2 versus Python3, C versus C++, etc.). In some implementations, one or more corpuses $116_{1-N}$ may also include natural language documentation on the subject of computer programming. This may include, for instance, computer programming textbooks, computer-programming HOWTO guides, inline comments contained in source code files, natural language comments stored in version control systems (VCS), e.g., during a "commit" of a recently-edited source code file, and so forth.

In some implementations, training module 104 may train machine learning model(s) 110 based on corpuses $116_{1-N}$. For example, one or more machine learning models 110 may be sequence-to-sequence language models that are subjected to unsupervised training based on corpuses $116_{1-N}$. Once machine learning model(s) 110 are trained, they may be used by inference module 106, e.g., at the behest of programmer associated with a client 118, to adapt existing source code snippets extracted (e.g., copied, cut, dragged) from one context (e.g., one source code file) to another context (e.g., destination source code).

This adapted source code snippet and/or the new combined source code that includes it may then be provided back to IDE 120 of client 118, e.g., by import module 108 or inference module 106. If the programmer was in the act of copying a source code snippet from one source code file for use in another, destination source code file, this may have the effect of the adapted source code snippet being "pasted" into the destination source code file. However, techniques described herein are not limited to inter-file transfers. In some implementations, techniques described herein may be used to copy/cut a source code snippet from one portion of a source code file and to paste it (in adapted form) into another portion of the same source code file.

Figure 2:
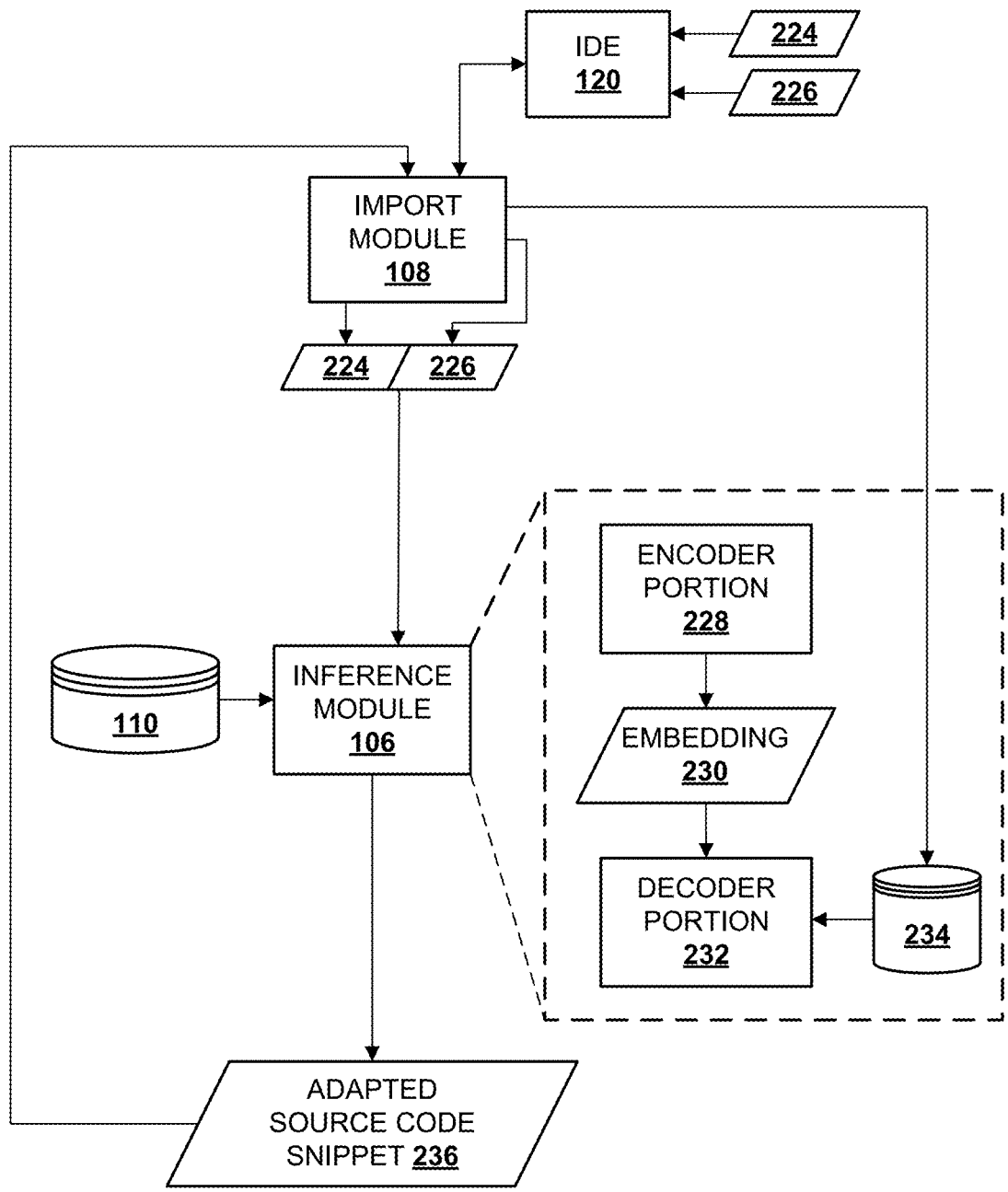
FIG. 2 schematically demonstrates an example of how various elements described herein may process data, in accordance with various implementations.

FIG. 2 schematically illustrates one example of how data may be processed by and flow between various components of FIG. 1. In FIG. 2, a programmer (not depicted) operates IDE 120 to import an existing source code snippet 224 into destination source code 226. These commands are detected by import module 108. Import module 108 obtains, e.g., from IDE 120 (e.g., via a plugin of IDE), data indicative of existing source code snippet 224 and destination source code 226. This data may include, for instance, existing source code snippet 224 and destination source code 226 in raw form, embeddings generated therefrom, generalized templates generated therefrom, etc.

Import module 108 may provide data indicative of some combination of 224/226 to inference module 106. In FIG. 2, a call-out box is shown at right to demonstrate how constituent components of inference module 106 may process data 224/226 in some implementations. Assuming machine learning model 110 is an encoder-decoder model, an encoder portion 228 of machine learning model 110 may be used by inference module 106 to process data 224/226 to generate an embedding 230. Embedding 230 may then be processed by inference module 106 based on a decoder portion 232. Output generated based on decoder portion 232 may include adapted source code snippet 236. In some implementations, adapted source code snippet 236 may be part of a larger combined source code that also includes the surrounding destination source code. In some such implementations, aspects of the surrounding destination source code 226 may also be adapted to receive adapted source code snippet 236.

Figure 3:
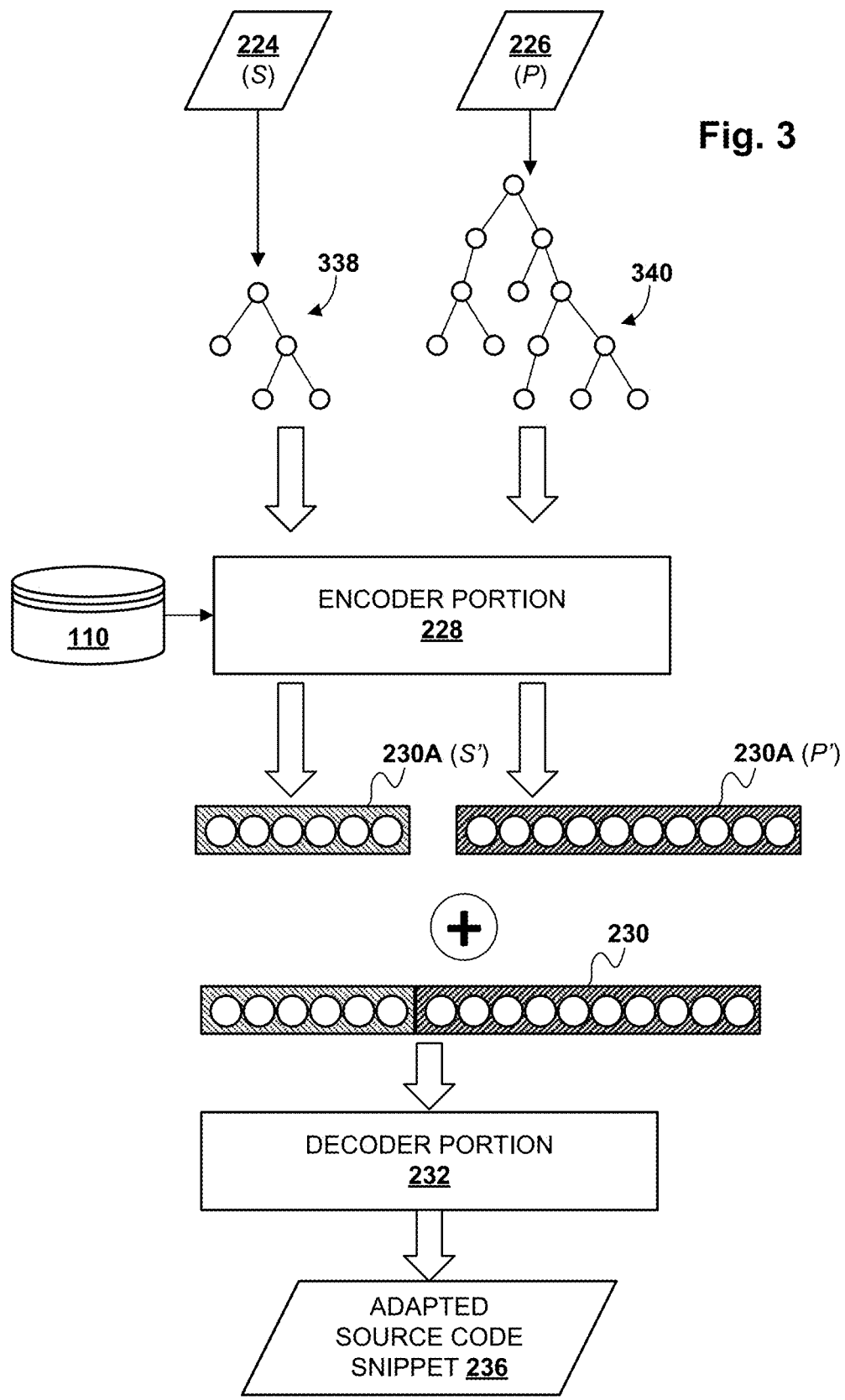
FIG. 3 schematically demonstrates an example of how aspects of the present disclosure associated with inference may be implemented, in accordance with various implementations.

Inference module 106 may process these data 224/226 in various ways. FIG. 3 demonstrates one such example. For purposes of the following explanations, let existing source code snippet 224 be S and destination source code 226 be P. In FIG. 3, existing source code snippet 224 (S) and destination source code (P) are first processed, e.g., by import module 108 or another component such as a compiler (not depicted), to generate respective abstract syntax trees (AST) 338, 340. Inference module 106 may then apply ASTs 338, 340 as inputs across encoder portion 228 to generate respective vector representations, 230A (S') and 230B (P'). These vector representations S' and P' may be concatenated or otherwise combined into a single embedding 230. Combined embedding 230 may then be applied, e.g., by inference module 106, across decoder portion 232 of machine learning model 110 to generate adapted source code snippet 236 (and in many cases, surrounding destination source code that may or may not also be adapted somewhat to receive adapted source code snippet 236).

Figure 4:
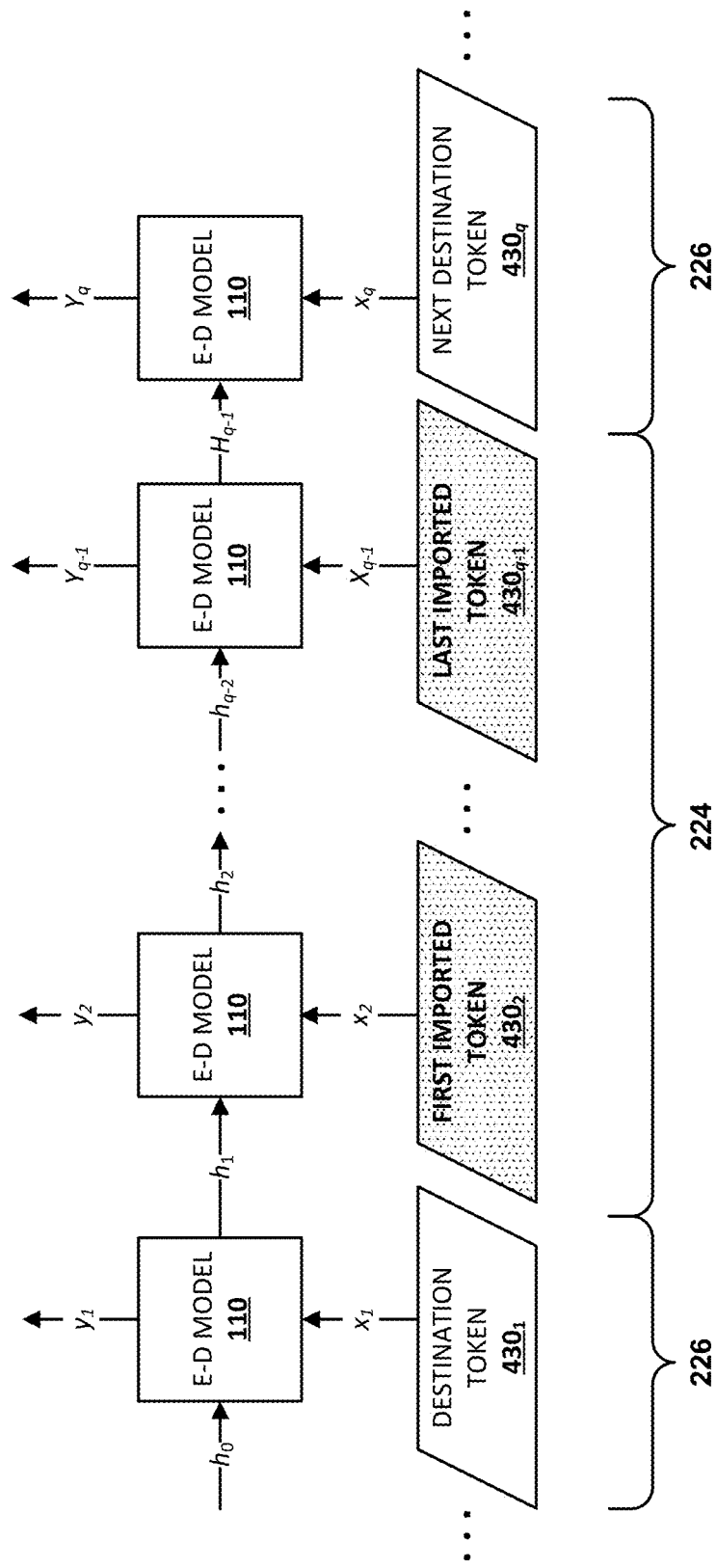
FIG. 4 schematically demonstrates another example of how aspects of the present disclosure associated with inference may be implemented, in accordance with various implementations.

FIG. 4 depicts another way that inference module 106 may process data 224/226. In FIG. 4, machine learning model 110 is labeled "E-D MODEL" to indicate that in this example, machine learning model 110 once again takes the form of an encoder-decoder model. Machine learning model 110 is shown in a partially "unfolded" state to demonstrate one non-limiting example of how it can be operated for q (q being an integer) iterations. In this example, machine learning model 110 most resembles a recurrent neural network, but this is not meant to be limiting. As noted above, machine learning model 110 and/or its constituent components (e.g., encoder portion 228, decoder portion 232) may take various forms, such as an LSTM network, a GRU network, a transformer network, etc. In FIG. 4, an input $x_i$ is applied across machine learning model 110 at each iteration i, along with a hidden state $h_{i-1}$ from a previous iteration (acting as "memory"), to generate output $y_i$.

In FIG. 4, an updated combined source code Q may be formed by pasting S in raw form into the desired location of P in raw form, such that Q=S+P. Q may then be processed to generate, e.g., as part of a new version of destination source code Q', adapted source code snippet 236. In particular, inference module 106 (not depicted) first processes a token $430_1$ of destination source code 226 that precedes a target paste location for existing source code snippet 224. This may at least partially "condition" or "prime" machine learning model 110 to the context of destination source code 226. Next, inference module 106 may process tokens $430_2$ . . . $430_{q-1}$ of existing source code snippet 224 itself. Lastly, inference module 106 may process tokens $430_q$ and onwards of destination source code 226 that is intended to follow the pasted (and adapted) source code snippet.

As an alternative to the example of FIG. 4, in some implementations, the entirety of destination source code 226 (e.g., P from the previous example) may be applied by inference module 106 across machine learning model 110 first, to condition/prime machine learning model 110 to accurately adapt existing source code snippet 224 to its new context. Then, the entirety of existing source code snippet 224 (e.g., S from the previous example) may be applied by inference module 106 across the machine learning model to generate adapted source code snippet 236.

Referring back to FIG. 2, in some implementations, application of decoder portion 232 of machine learning model 110 by inference module 106 may be subject to one or more decoder constraints 234. Decoder constraints 234 may be identified or otherwise ascertained, e.g., by import module 108 and/or inference module 106, by processing destination source code 226. For example, names of variables and functions in destination source code 226 may be extracted and used to form a dictionary. During application, decoder portion 232 may be biased towards terms in this dictionary, or to those dictionary terms and semantically similar terms (e.g., "last name" has a semantically similar meaning to "surname"). In some implementations, decoder constraints 234 may be formed as a number of word embeddings, or generalized forms of words, which may allow for additional flexibility when biasing decoder portion 232.

Figure 5:
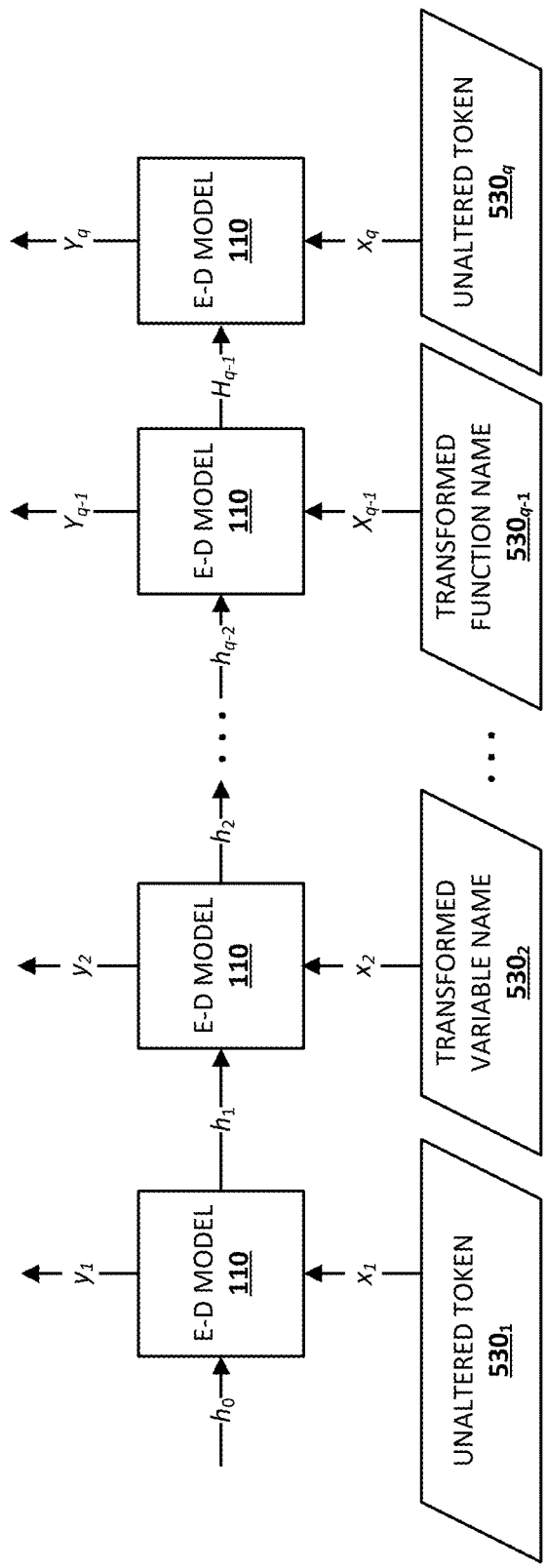
FIG. 5 schematically demonstrates an example of how aspects of the present disclosure associated with training may be implemented, in accordance with various implementations.

FIG. 5 depicts one example of how machine learning model 110 may be trained, e.g., by training module 104. Many of the aspects of FIG. 5 are similar to those of FIG. 4, and therefore are labeled similarly. For example, machine learning model 110 once again takes the form of an encoder-decoder model depicted in an unfolded form. In this example, a sequence of tokens $530_{1-q}$ of training source code are iteratively applied as input across machine learning model 110, similar to FIG. 4. However, in FIG. 5, noise is injected into the training source code so that machine learning model 110 can "learn" how to reassemble the original source code from noisy code. In particular, in FIG. 5, some tokens such as $530_1$ and $530_q$ are left unaltered. Other tokens corresponding to variable names or filenames, such as $530_2$ and $530_{q-1}$, are transformed. These unaltered and transformed tokens $530_{1-q}$ may be encoded into embeddings and then decoded to generate output. The output may be compared to the original, unaltered training source code to determine error(s). These error(s) may be used to train machine learning model 110, e.g., using techniques such as gradient descent and back propagation.

FIGS. 6A and 6B depict an example graphical user interface (GUI) for a source code editor application (e.g., part of IDE 120 or standalone) that may be operated by a programmer (not depicted) to edit source code. In this example, the programmer has pasted the existing source code snippet "resetPassword(employeeID)" into destination source code that defines a function, fakeReachoutFunction. The pasted source code snippet is indicated in FIG. 6A by the bolded, italicized text.

In FIG. 6A, the existing source code snippet, unaltered, may not be proper syntactically and/or semantically in the context of fakeReachoutFunction. For example, prior to the pasting of the existing source code snippet, fakeReachoutFunction (when compiled and executed) would cycle through some number (employee_count) of employees, sending each a text message (via a hypothetical "sendText" function) that reminds the employee of a picnic that evening. At each iteration, the employee is identified by the long variable i (e.g., the employees may have consecutive employee identifiers starting at the first employee). However, the resetPassword function as pasted receives a variable called employeeID, which has not been defined in the context of fakeReachoutFunction. Moreover, it may also be the case that the resetPassword function is not available natively in fakeReachoutFunction, e.g., because a library to which the resetPassword function belongs has not been linked.

Accordingly, in FIG. 6B, the pasted source code snippet "resetPassword(employeeID)" has been adapted/transformed into the context of fakeReachoutFunction. For example, the argument employeeID has been replaced with the variable i that is already defined and used in fakeReachoutFunction. Additionally, the function name resetPassword has been transformed into a different, yet semantically similar, function called updateCredentials. It may be the case that, for the code base being edited, the updateCredentials function is linked and/or its use is mandated (e.g., by an entity in charge of the code base).

Notably, resetPassword and updateCredentials are semantically similar to each other. In some implementations, machine learning model 110 may be trained to map semantically similar tokens to each other, e.g., based on distances between their embeddings in an embedding space. Additionally or alternatively, decoder constraints 234 may be defined to include embeddings generated from terms in source code. When decoder portion 232 is applied, it may be biased towards these embeddings and other nearby (and hence, semantically similar) embeddings.

Figure 7:
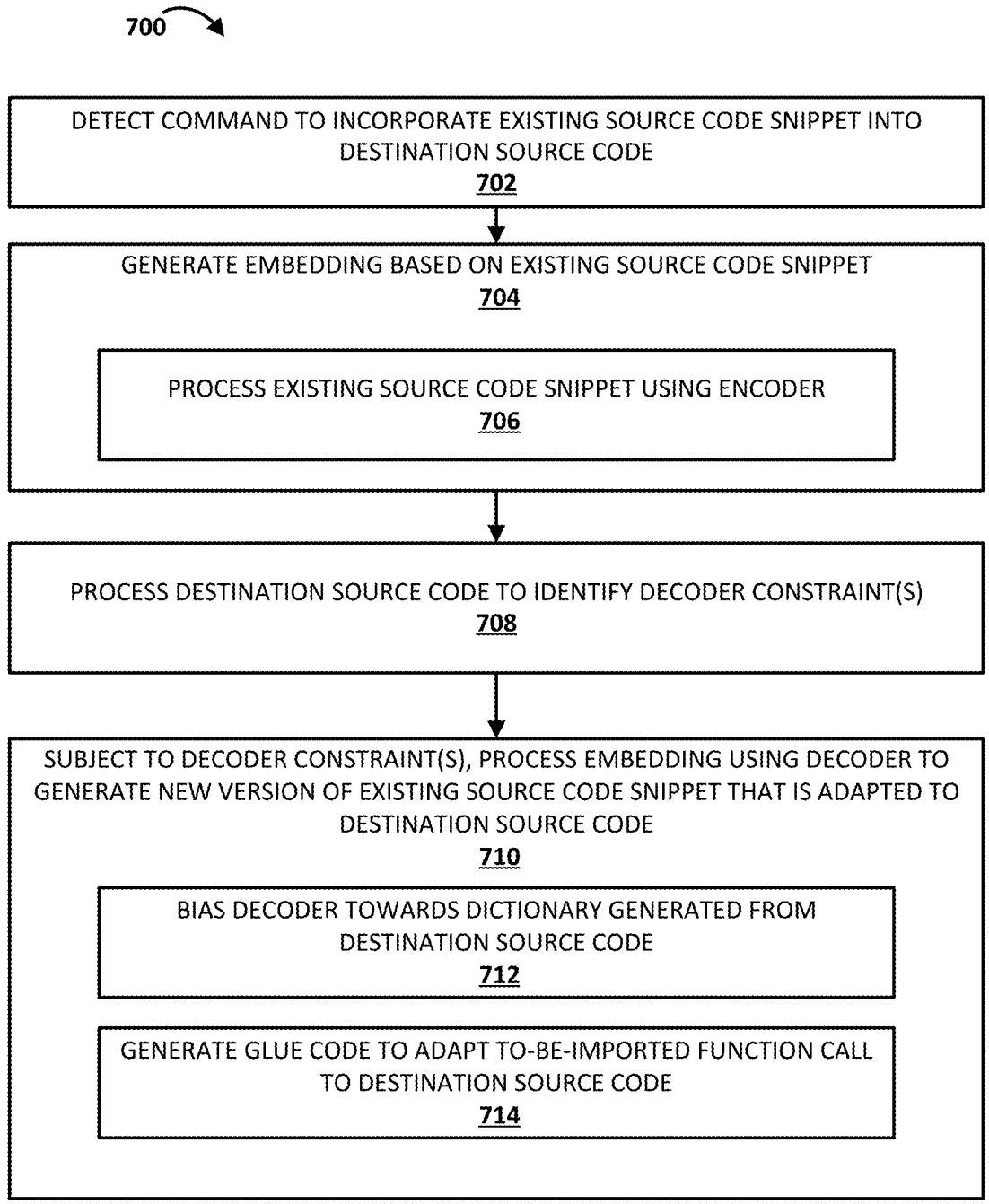
FIG. 7 depicts a flowchart illustrating an example method for practicing selected aspects of the present disclosure.

FIG. 7 is a flowchart illustrating an example method 700 of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 700 are shown in a particular order, this is not meant to be limiting. One or more operations may be reordered, omitted or added.

At block 702, the system may detect a command to incorporate an existing source code snippet into destination source code. For example, a programmer operating IDE 120 may copy/cut source code from one source code file and paste it into another, destination source code file. Alternatively, in some implementations, IDE 120 may present, e.g., as part of a GUI, graphical elements that represent source code snippets in raw form or in generalized/template form. These graphical elements may be dragged into destination source code files, e.g., in textual form and/or in a flowchart form that is common in visual IDEs. In yet other implementations, existing source code snippets may be imported into locations of destination source code in other ways, such as through an "import" menu.

At block 704, the system may generate an embedding (e.g., 230) based on the existing source code snippet. In some implementations, and as indicated at block 706, the generating of block 704 may include processing the existing source code snippet using an encoder (e.g., encoder portion 228). These encoders may take various forms, such as sequence-to-sequence encoders (e.g., RNNs, LSTM, GRU, transformers), GNNs, and so forth.

At block 708, the system may process the destination source code to identify one or more decoder constraints. For example, the system may extract variable names, function names, and any other token name that may be custom or proprietary to the destination source code, and/or define a context of the destination source code. In some implementations, the destination source code may be converted to a data structure such as an AST to perform these extractions. These extracted names may be added to a dictionary, which may include the names themselves, grammatical variations of the names, and/or embeddings generated from the names.

Subject to the one or more decoder constraints identified at block 708, at block 710, the system may process the embedding using a decoder (e.g., decoder portion 232) to generate a new version of the existing source code snippet that is adapted to the destination source code. For example, at block 712, the system may bias the decoder towards the dictionary generated from the destination source code at block 708. For example, if at each iteration of its application, the machine learning model 110 provides probabilities for some number of candidate tokens to be output, then probabilities associated with those tokens that are in the dictionary or semantically similar to terms in the dictionary may have their probabilities increased relative to other tokens not in the dictionary.

Depending on the nature of the existing source code snippet and the context of the destination source code, in some implementations, at block 714, the system may generate glue code to adapt a to-be-imported function call contained in the existing source code snippet to the destination source code. For example, for neighboring (or at least logically proximate) application programming interface (API) calls, a programmer may provide output of a first API call to a next API call. In many cases the output of the first API call may need to be transformed or otherwise processed before being used as input for the second API call. Accordingly, machine learning model 110 may be trained, e.g., by training module 104, to automatically "wire" output from one API call to input of another API call. In particular, machine learning model 110 may be trained on glue code that has been used previously to couple the same or similar API calls. If output of one function is always a second input of another function B, that can be learned.

Referring back to FIG. 7, the new version of the existing source code snippet that is adapted to the destination source code may be presented, e.g., in IDE 120, in various ways. In some implementations, when the existing source code is pasted or otherwise imported into destination source code, annotations (e.g., coloring, pop-up window, etc.) may be rendered showing how the source code snippet might be adapted to the destination source code. The programmer may be able to accept the changes, reject the changes, or modify the changes. In other implementations, the original source code snippet may be pasted and remain temporarily (e.g., for five seconds) before being transformed into the new version of the source code snippet that is adapted to the destination source code. In other implementations, the adaptation/transformation may occur immediately upon import, in which case the user may never see the original source code snippet pasted into the destination source code.

In some implementations, the origin of the original source code snippet (e.g., a URL or other identifier of a code base, library, or API) may be captured, e.g., as part of a cut/copy command. This may allow attribution of the origin to be added to the destination source code, e.g., as a comment, commit comment, etc. Doing so may provide more flexibility to the programmer to visualize changes made to the original source code snippet during adaptation (which they can accept, reject, or modify, for instance). These attributions would also provide convenient documentation for future programmers. In some implementations, such attributions may contain additional information, such as commit comments about the original source code snippet, a developer identifier of the original source code snippet, standards to which the original source code snippet is compatible/incompatible, etc.

Figure 8:
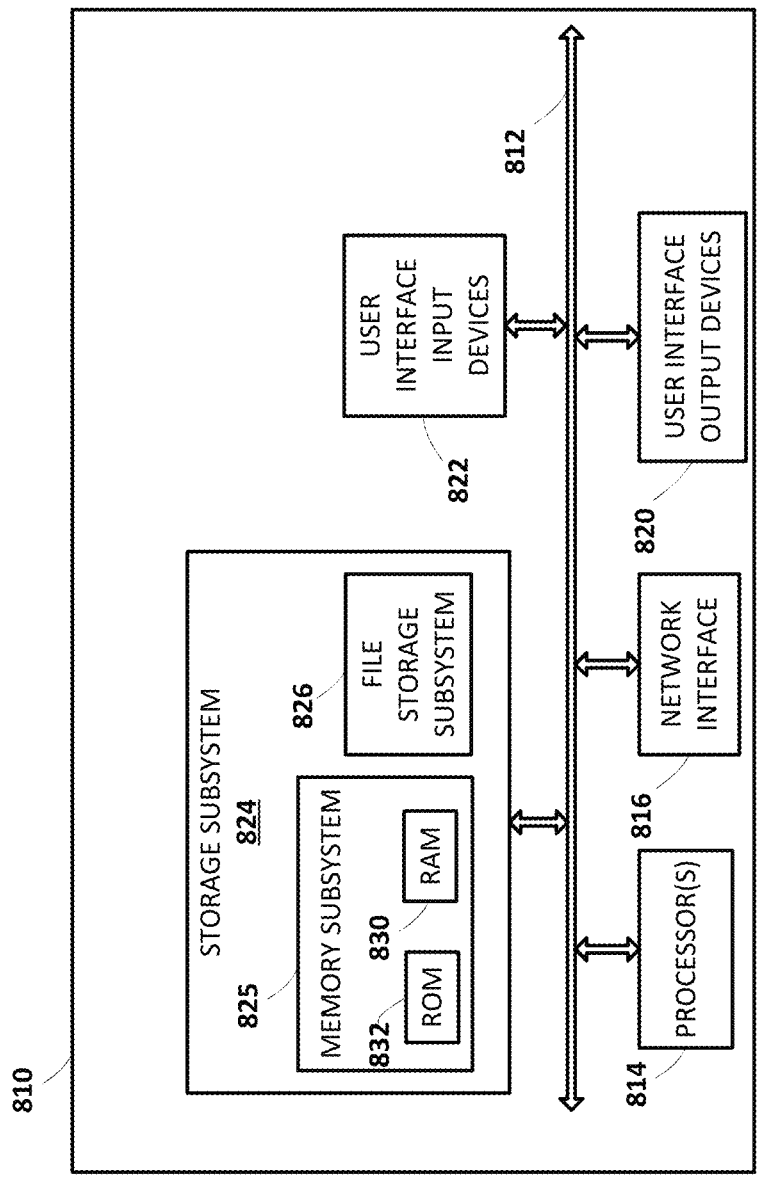
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 6, as well as to implement various components depicted in FIGS. 1-2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

Examples described herein have been related to adapting existing source code snippets to different contexts, but this is not meant to be limiting. In some implementations, techniques described herein may be usable to adapt snippets of other types of structured documents into new contexts. As one example, it is very common for lawyers to adapt legal language from one document (e.g., a contract) to another. Machine learning models such as neural language models that are trained on legal documents, rather than source code bases, may be used to adapt existing snippets of legal documents into destination legal documents having different contexts. For example, a contract clause used in a contract intended to be enforceable in a first state may be copied and pasted into another contract intended to be enforceable in a second state. If the neural language model is trained on contracts (and other sources, such as statutes, regulations, caselaw, etc.) from both states, it may be usable to automatically adapt the contract clause to the seconds state's laws and/or contractual norms. As another example, a contract clause could be copied from a first contract that involves a first set of parties to a second contract that involves a second set of parties. The clause may be adapted automatically to replace the first set of parties with the second set of parties. Other possibilities are contemplated.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    detecting, at an integrated development environment (IDE), a paste command to incorporate an existing source code snippet into destination source code;
    assembling an input for a transformer network that includes first data indicative of the existing source code snippet, second data indicative of a first portion of the destination source code that would precede the existing source code snippet, and third data indicative of a second portion of the destination source code that would follow the existing source code snippet;
    processing the input using the transformer network to generate a new version of the existing source code snippet adapted to a context of the destination source code, wherein the first and second portions of the destination source code condition the transformer to the context of the destination source code; and
    causing the IDE to render visual output indicative of the new version of the existing source code snippet.

2. The method of claim 1, wherein the existing source code snippet includes a function call, and the processing includes generating glue code to adapt the function call to the destination source code.

3. The method of claim 1, wherein the new version of the existing source code snippet includes function names and variable names that are adapted to the destination source code.

4. The method of claim 1, wherein the first data, second data, and third data comprise raw source code.

5. A method implemented using one or more processors, comprising:
    detecting, at an integrated development environment (IDE), a command to incorporate an existing source code snippet into destination source code;
    assembling an input for a transformer network that includes first data indicative of the existing source code snippet, second data indicative of a first portion of the destination source code that would precede the existing source code snippet, and third data indicative of a second portion of the destination source code that would follow the existing source code snippet;
    processing the input using the transformer network to generate a new version of the existing source code snippet adapted to a context of the destination source code, wherein the first and second portions of the destination source code condition the transformer to the context of the destination source code; and
    causing the IDE to render visual output indicative of the new version of the existing source code snippet;
    wherein the command comprises a command to drag-and-drop a graphical element that includes the existing source code snippet into the location within the destination source code.

6. A method implemented using one or more processors, comprising:
    detecting, at an integrated development environment (IDE), a command to incorporate an existing source code snippet into destination source code;
    assembling an input for a transformer network that includes first data indicative of the existing source code snippet, second data indicative of a first portion of the destination source code that would precede the existing source code snippet, and third data indicative of a second portion of the destination source code that would follow the existing source code snippet;
    processing the input using the transformer network to generate a new version of the existing source code snippet adapted to a context of the destination source code, wherein the first and second portions of the destination source code condition the transformer to the context of the destination source code; and
    causing the IDE to render visual output indicative of the new version of the existing source code snippet;
    wherein the first data, second data, and third data comprise, respectively, a first abstract syntax tree (AST) generated from the existing source code snippet, a second AST generated from the first portion of the destination source code, and a third AST generated from the second portion of the destination source code.

7. A system comprising one or more processors and memory storing instructions that, in response to execution by the one or more processors, cause the one or more processors to:

detect, at an integrated development environment (IDE), a paste command to incorporate an existing source code snippet into destination source code;
assemble an input for a transformer network that includes first data indicative of the existing source code snippet, second data indicative of a first portion of the destination source code that would precede the existing source code snippet, and third data indicative of a second portion of the destination source code that would follow the existing source code snippet;
process the input using the transformer network to generate a new version of the existing source code snippet adapted to a context of the destination source code, wherein the first and second portions of the destination source code condition the transformer to the context of the destination source code; and
cause the IDE to render visual output indicative of the new version of the existing source code snippet.

8. The system of claim 7, wherein the existing source code snippet includes a function call, and the instructions to process include instructions to generate glue code to adapt the function call to the destination source code.

9. The system of claim 7, wherein the new version of the existing source code snippet includes function names and variable names that are adapted to the destination source code.

10. The system of claim 7, wherein the first data, second data, and third data comprise raw source code.

11. A system comprising one or more processors and memory storing instructions that, in response to execution by the one or more processors, cause the one or more processors to:
detect, at an integrated development environment (IDE), a command to incorporate an existing source code snippet into destination source code;
assemble an input for a transformer network that includes first data indicative of the existing source code snippet, second data indicative of a first portion of the destination source code that would precede the existing source code snippet, and third data indicative of a second portion of the destination source code that would follow the existing source code snippet;
process the input using the transformer network to generate a new version of the existing source code snippet adapted to a context of the destination source code, wherein the first and second portions of the destination source code condition the transformer to the context of the destination source code; and
cause the IDE to render visual output indicative of the new version of the existing source code snippet;
wherein the command comprises a command to drag-and-drop a graphical element that includes the existing source code snippet into the location within the destination source code.

12. A system comprising one or more processors and memory storing instructions that, in response to execution by the one or more processors, cause the one or more processors to:
detect, at an integrated development environment (IDE), a command to incorporate an existing source code snippet into destination source code;
assemble an input for a transformer network that includes first data indicative of the existing source code snippet, second data indicative of a first portion of the destination source code that would precede the existing source code snippet, and third data indicative of a second portion of the destination source code that would follow the existing source code snippet;
process the input using the transformer network to generate a new version of the existing source code snippet adapted to a context of the destination source code, wherein the first and second portions of the destination source code condition the transformer to the context of the destination source code; and
cause the IDE to render visual output indicative of the new version of the existing source code snippet;
wherein the first data, second data, and third data comprise, respectively, a first abstract syntax tree (AST) generated from the existing source code snippet, a second AST generated from the first portion of the destination source code, and a third AST generated from the second portion of the destination source code.

13. At least one non-transitory computer-readable medium comprising instructions that, in response to execution by one or more processors, cause the one or more processors to:
detect, at an integrated development environment (IDE), a paste command to incorporate an existing source code snippet into destination source code;
assemble an input for a transformer network that includes first data indicative of the existing source code snippet, second data indicative of a first portion of the destination source code that would precede the existing source code snippet, and third data indicative of a second portion of the destination source code that would follow the existing source code snippet;
process the input using the transformer network to generate a new version of the existing source code snippet adapted to a context of the destination source code, wherein the first and second portions of the destination source code condition the transformer to the context of the destination source code; and
cause the IDE to render visual output indicative of the new version of the existing source code snippet.

14. The at least one non-transitory computer-readable medium of claim 13, wherein the existing source code snippet includes a function call, and the instructions to process include instructions to generate glue code to adapt the function call to the destination source code.

15. The at least one non-transitory computer-readable medium of claim 13, wherein the new version of the existing source code snippet includes function names and variable names that are adapted to the destination source code.

16. The at least one non-transitory computer-readable medium of claim 13, wherein the first data, second data, and third data comprise raw source code.

17. At least one non-transitory computer-readable medium comprising instructions that, in response to execution by one or more processors, cause the one or more processors to:
detect, at an integrated development environment (IDE), a command to incorporate an existing source code snippet into destination source code;
assemble an input for a transformer network that includes first data indicative of the existing source code snippet, second data indicative of a first portion of the destination source code that would precede the existing source code snippet, and third data indicative of a second portion of the destination source code that would follow the existing source code snippet;
process the input using the transformer network to generate a new version of the existing source code snippet adapted to a context of the destination source code, wherein the first and second portions of the destination source code condition the transformer to the context of the destination source code; and
cause the IDE to render visual output indicative of the new version of the existing source code snippet;
wherein the command comprises a command to drag-and-drop a graphical element that includes the existing source code snippet into the location within the destination source code.

\* \* \* \* \*